United States Patent [19]
Leicht et al.

[11] 3,893,989
[45] July 8, 1975

[54] PROCESS FOR POLYMERIZING PROPYLENE

[75] Inventors: Giorgio Leicht, Terni; Alberto Tanchi, Torre Orsina, both of Italy

[73] Assignee: Montecatini Edison S.p.A., Milan, Italy

[22] Filed: Oct. 9, 1973

[21] Appl. No.: 404,674

Related U.S. Application Data

[63] Continuation of Ser. No. 165,844, July 6, 1971, abandoned.

[52] U.S. Cl....... 260/93.7; 260/94.9 B; 260/94.9 D; 260/94.9 GD; 260/94.9 P; 260/878 B
[51] Int. Cl............................ C08f 1/42; C08f 3/10
[58] Field of Search... 260/94.9 B, 94.9 P, 94.9 GD, 260/94.9 D, 93.7, 878 B

[56] References Cited
UNITED STATES PATENTS
3,035,037  5/1962  Rindtorff et al................ 260/94.9 B
3,649,579  3/1972  Gobran et al.................. 260/878 B FOREIGN PATENTS OR APPLICATIONS
227,730  3/1960  Australia..................... 260/94.9 GD

*Primary Examiner*—Joseph L. Schofer
*Assistant Examiner*—A Holler
*Attorney, Agent, or Firm*—Hubbell, Cohen, & Stiefel

[57] ABSTRACT

A method of polymerizing propylene to obtain a polymer having a high apparent density which comprises first polymerizing propylene in the liquid phase at relatively low temperature in the presence of a catalyst system which is the reaction product of violet crystalline $TiCl_3$ and an organo aluminum compound, followed by further polymerization of propylene in the liquid phase at a higher temperature.

8 Claims, No Drawings

PROCESS FOR POLYMERIZING PROPYLENE

This is a continuation of Ser. No. 165,844, filed July 6, 1971, now abandoned.

BACKGROUND OF THE INVENTION

1. Field of the Invention

The present invention relates to a process for polymerizing propylene to obtain an isotactic polymer having a high bulk density.

2. Description of the Prior Art

Processes are known for the stereospecific polymerization of propylene, using as the catalyst the reaction product of titanium trichloride (obtained by reduction of titanium tetrachloride with aluminum) and an aluminum alkyl compound, in particular, an aluminum alkyl halide.

These catalysts produce polymers having a relatively high bulk density and a very wide particle size distribution, generally between 20 and 2,000μ.

It is also known that when propylene is polymerized in the presence of a catalyst that is the reaction product of crystalline violet titanium trichloride (obtained by reduction of $TiCl_4$ with an organo-aluminum compound) and an aluminum alkyl compound, polymers with a very narrow particle size distribution in the range of 100μ are obtained. In this case, the bulk density is rather low and it can be modified only by acting upon the compactness of the polymer.

The obtaining of propylene polymers having a high bulk density results in several advantages: (1) the volume of the containers employed to store a given weight of the polymer is reduced and (2) the polymer can be fed to screw conveyors in larger amounts (on a weight basis) per unit time than a polymer having a lower bulk density. Moreover, where dyeing of the propylene polymer is contemplated, the dispersion of pigments therein is considerably more homogeneous.

When polymerization of the propylene is effected with a catalyst that is made up of crystalline violet titanium trichloride (obtained by reduction of $TiCl_4$ with an organic aluminum compound) and an aluminum alkyl compound, a high bulk density may be obtained by lowering the polymerization temperature. Such process, however, is not of any significant practical interest inasmuch as a decrease in the polymerization temperature also results in a considerable decrease in the polymer yield.

SUMMARY OF THE INVENTION

It has now been surprisingly found that propylene polymers having a high apparent density can be obtained without lowering the polymerization temperature (and consequently retaining high yields and process economy) by carrying out the polymerization of propylene with a catalyst system made up of violet crystalline titanium trichloride (obtained by the reduction of $TiCl_4$ with an aluminum alkyl compound) and an organo-aluminum compound, the propylene polymerization being carried out in the presence of polypropylene prepared by polymerizing propylene with the same catalyst system but at relatively low temperatures, i.e., lower than 30°C.

DESCRIPTION OF THE PREFERRED EMBODIMENTS

According to a preferred embodiment of the process of this invention, propylene is first polymerized at a temperature of from about 15° to 25°C and then, in the presence of the thus formed polymer and of the catalyst employed in the low temperature polymerization, polymerization is continued and completed at higher temperatures, generally ranging from 40° to 90°C, desirably in the presence of a hydrocarbon solvent.

The quantity of polymer obtained at a low temperature should be from about 0.05 to 15 percent by weight of the total polymer which is obtained.

The process of the invention may be carried out either in one reactor or in two reactors connected in series. In the latter case, the polymerization slurry of the first reactor, wherein the low temperature polymerization has been effected, is transferred to the second reactor wherein the polymerization is carried out at a higher temperature.

The propylene polymerization, both in the lower temperature stage and higher temperature stage is carried out in the liquid phase, either in the presence or absence of an inert hydrocarbon solvent.

The violet crystalline titanium trichloride employed as one catalytic component in the process of the present invention is obtained according to well known methods, by the reduction of $TiCl_4$ with the aid of an organo-metallic compound, such as an organo-aluminum compound. In particular, titanium trichloride can be obtained by the reduction of $TiCl_4$ with the aid of an aluminum trialkyl or alkyl aluminum halide. The thus obtained titanium trichloride may then be converted to the violet crystalline form, e.g., by a thermal treatment.

The alkyl aluminum compounds which may be used as a catalytic component are compounds of the general formula $$AlR_3 \text{ or } AlR_2X,$$

wherein R is a hydrocarbon radical containing from 2 to 6 carbon atoms, and X is a halogen.

The propylene polymers prepared according to this invention are highly isotactic and exhibit a high apparent density, i.e., higher than those for corresponding polypropylenes prepared in the absence of polypropylene obtained by a low temperature polymerization.

The invention is further illustrated by the following examples All parts given are by weight unless otherwise stated.

In the examples, the violet crystalline titanium trichloride employed as a component of the catalytic system was obtained from $TiCl_4$ by reduction with either diethyl aluminum monochloride, ethyl aluminum dichloride, or with sesquichloride, followed by thermal treatment between 110° and 140°C.

EXAMPLE 1

Initially, propylene was polymerized at a low temperature as follows. A stainless steel autoclave having a 200 liter capacity was fed at 18°C, with:

| | |
|---|---|
| n-heptane | 50 liters |
| titanium trichloride | 25 g |
| Aluminum diethyl chloride | 86 g |
| liquid propylene | 5 liters |

1 kg of polypropylene was obtained in this low temperature polymerization step. The mixture was subsequently heated by bringing it, in about 10 minutes, to a temperature of 70°C and propylene was added under a pressure of 6 atmospheres, until 45 liters had been introduced (total propylene 50 liters). The unreacted propylene was then degassed.

The whole was cooled and the catalyst was decomposed by the addition of 2 liters of n-butyl alcohol. The whole was heated to 80°C for 1 hour and was then cooled. The slurry was transferred to a 400 liter reactor and 50 liters of water and 10 g of a surface active agent (condensation product of ethylene oxide and sorbitan monooleate) were added and the whole was steam distilled to remove all of the n-heptane.

The suspension was centrifuged and the obtained product was dried.

20 kg of polypropylene were obtained having a bulk density of 0.5 g/cc.

EXAMPLE 2

Using the same autoclave as in Example 1, at 18°C, there were introduced:

| | |
|---|---|
| n-heptane | 50 liters |
| titanium trichloride | 25 g |
| Aluminum diethyl chloride | 86 g |
| propylene | 2.5 liters |

In this low temperature polymerization step 0.3 kg of polypropylene was obtained. The temperature was raised to 70°C over a period of about 10 minutes and propylene was fed under a pressure of 6 atmospheres, until 47.5 liters were introduced (total propylene 50 liters). The unreacted propylene was then degassed.

The whole was cooled and the catalytic complex was decomposed by the addition of 2 liters n-butyl alcohol. The whole was heated to 80°C for 1 hour and then was cooled, and the slurry was transferred into a 400 liter reactor. 50 liters of water and 10 g of a surface active agent were added and then the whole was steam distilled to remove all of the n-heptane.

The suspension was centrifuged and the obtained product was dried.

20 kg of polypropylene were obtained having a bulk density of 0.49 g/cc.

EXAMPLE 3

To the same autoclave as that of the preceding examples were fed, at 18°C:

| | |
|---|---|
| n-heptane | 50 liters |
| titanium trichloride | 25 g |
| Aluminum diethyl chloride | 86 g |
| propylene | 6 liters |

The polypropylene obtained in this low temperature polymerization step was 1 kg. The whole was heated to 55°C over a period of about 10 minutes and propylene was fed under a pressure of 6 atmospheres until 54 liters had been introduced (total propylene 60 liters).

The subsequent procedure was exactly as described in the foregoing examples.

20 kg of polypropylene were obtained having a bulk density of 0.52 g/cc.

EXAMPLE 4

A three-neck glass flask having a 10 liter capacity and provided with a stirrer was fed at 20°C with:

| | |
|---|---|
| n-heptane | 8 liters |
| titanium trichloride | 25 g |
| Aluminum diethyl chloride | 86 g |
| propylene | 34 g in 2 hours |

The polymerization was carried out at 20°C for a 2 hour period during which the propylene was introduced. 30 grams of polymer were obtained, which were transferred to a 200 liter stainless steel autoclave, and 42 liters of n-heptane were added thereto.

The whole was heated to 70°C and propylene was fed under a pressure of 6 atmospheres until 50 liters had been added. The unreacted propylene was degassed.

The whole was cooled and the catalytic complex was decomposed by the addition of 2 liters of n-butyl alcohol. The whole was further heated for 1 hour to 80°C, then cooled, and the slurry was transferred to a 400 liter reactor, 50 liters of water and 10 g of surface active agent were added and the whole was then steam distilled to remove all of the n-heptane. The suspension was centrifuged and the obtained product was dried.

20 kg of polypropylene were obtained having an apparent density of 0.5 g/cc.

EXAMPLE 5 (Comparative Example)

A 200 liter stainless steel autoclave was fed at 18°C with:

| | |
|---|---|
| n-heptane | 50 liters |
| titanium trichloride | 25 g |
| aluminum diethyl chloride | 86 g |

The mixture was heated to 70°C over a period of about 10 minutes and propylene was fed under a pressure of 6 atmospheres until 50 liters had been added.

The unreacted propylene was degassed and the procedure was then conducted exactly as described in the foregoing examples.

20 kg of polypropylene were obtained having a bulk density of 0.45 g/cc.

EXAMPLE 6 (Comparative Example)

The autoclave of the foregoing example was fed, at 18°C, with:

| | |
|---|---|
| n-heptane | 50 liters |
| titanium trichloride | 25 g |
| aluminum diethyl chloride | 86 g |

The mixture was heated to 55°C over a period of about 10 minutes and propylene was then fed under a pressure of 6 atmospheres until 60 liters propylene were present in the autoclave.

The unreacted propylene was degassed and then the procedure was conducted exactly as in the foregoing examples.

20 kg of polypropylene were obtained having a bulk density of 0.47 g/cc.

Variations can, of course, be made without departing from the spirit and scope of the invention.

Having thus described the invention, what is desired to be secured by Letters Patent and hereby claimed is:

1. A method for preparing stereoregular propylene polymers having a high bulk density, comprising polymerizing propylene in the liquid phase at a temperature of from about 40° to 90°C in the presence of (1) a catalytic system which is the reaction product of:

a. violet crystalline titanium trichloride obtained by reducing titanium tetrachloride with an aluminum alkyl compound; and
b. an organic aluminum compound of the formula $$AlR_3 \text{ or } AlR_2X,$$

wherein R is a hydrocarbon radical having from 2 to 6 carbon atoms and X is halogen,
and in the presence of (2) polypropylene prepared by low temperature polymerization of propylene in the liquid phase in the presence of the catalytic system as defined above, the low temperature being less than 40°C.

2. The method of claim 1 wherein said low temperature polymerization is less than 30°C.

3. The method of claim 1 wherein the propylene polymerizations are carried out in the presence of a hydrocarbon solvent.

4. The method of claim 1 wherein the propylene polymerizations are carried out in the absence of a hydrocarbon solvent.

5. The method of claim 1 wherein said violet crystalline titanium trichloride is obtained by reducing titanium tetrachloride with an aluminum alkyl halide.

6. The method of claim 1 wherein component (b) of the catalytic system is aluminum diethyl monochloride.

7. The method of claim 1 wherein said low temperature polymerization of propylene is carried out at from about 15° to 25°C.

8. The method of claim 1 wherein the amount of propylene polymerized at the low temperature represents from 0.05 to 15 percent by weight of the total polymer obtained.

* * * * *

PO-1050
(5/69)

UNITED STATES PATENT OFFICE
CERTIFICATE OF CORRECTION

Patent No. 3,893,989      Dated July 8, 1975

Inventor(s) Giorgio LEICHT and Albert TANCHI

It is certified that error appears in the above-identified patent and that said Letters Patent are hereby corrected as shown below:

Title page, left side: should read -- Priority Data, application Italy 27135-A/70, July 8, 1970 --.

Title page, right side, lines 5-6 of the "Abstract": "crystallline" should read -- crystalline --.

Column 2, line 46: "examples All" should read -- examples. All --.

Signed and Sealed this

*thirtieth* Day of *September 1975*

[SEAL]

Attest:

RUTH C. MASON
*Attesting Officer*

C. MARSHALL DANN
*Commissioner of Patents and Trademarks*